United States Patent [19]

Pekala et al.

[11] Patent Number: 5,932,185
[45] Date of Patent: Aug. 3, 1999

[54] METHOD FOR MAKING THIN CARBON FOAM ELECTRODES

[75] Inventors: Richard W. Pekala, Pleasant Hill; Steven T. Mayer, San Leandro; James L. Kaschmitter, Pleasanton; Robert L. Morrison, Modesto, all of Calif.

[73] Assignee: The Regents of the University of California, Oakland, Calif.

[21] Appl. No.: 08/110,003

[22] Filed: Aug. 23, 1993

[51] Int. Cl.⁶ ........................................ C01B 31/00
[52] U.S. Cl. ........................ 423/445 R; 423/447.1; 264/29.1
[58] Field of Search ............ 423/445 R, 447.1, 423/447.2; 264/29.1, 29.5; 429/218, 245

[56] References Cited

U.S. PATENT DOCUMENTS

| | | | |
|---|---|---|---|
| 3,922,334 | 11/1975 | Marek et al. | 423/445 R |
| 3,927,186 | 12/1975 | Vinton et al. | 423/445 R |
| 4,756,898 | 7/1988 | Hopper et al. | 423/445 |
| 4,832,881 | 5/1989 | Arnold, Jr. et al. | 423/445 |
| 4,873,218 | 10/1989 | Pekala | 502/418 |
| 4,959,281 | 9/1990 | Nishi et al. | 423/445 |
| 4,997,804 | 3/1991 | Pekala | 502/418 |
| 5,086,085 | 2/1992 | Pekala | 521/187 |
| 5,208,003 | 5/1993 | Simanol et al. | 423/445 |
| 5,217,657 | 6/1993 | Engle | 264/29.5 |

FOREIGN PATENT DOCUMENTS

| | | | |
|---|---|---|---|
| 167271 | 8/1985 | Japan | 423/445 |

*Primary Examiner*—Michael Lewis
*Assistant Examiner*—Stuart L. Hendrickson
*Attorney, Agent, or Firm*—L.E. Carnahan

[57] ABSTRACT

A method for fabricating thin, flat carbon electrodes by infiltrating highly porous carbon papers, membranes, felts, metal fibers/powders, or fabrics with an appropriate carbon foam precursor material. The infiltrated carbon paper, for example, is then cured to form a gel-saturated carbon paper, which is subsequently dried and pyrolyzed to form a thin sheet of porous carbon. The material readily stays flat and flexible during curing and pyrolyzing to form thin sheets. Precursor materials include polyacrylonitrile (PAN), polymethylacrylonitrile (PMAN), resorcinol/formaldehyde, catechol/formaldehyde, phenol/formaldehyde, etc., or mixtures thereof. These thin films are ideal for use as high power and energy electrodes in batteries, capacitors, and fuel cells, and are potentially useful for capacitive deionization, filtration and catalysis.

22 Claims, No Drawings

METHOD FOR MAKING THIN CARBON FOAM ELECTRODES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to carbon foam hybrid/composite electrodes, particularly to thin film carbon hybrid/composite electrodes, and more particularly to a method for forming thin, flat porous carbon sheets by infiltrating a highly porous fiber matrix with a carbon foam precursor material, curing to form a polymer-saturated material, and pyrolyzing to form a thin sheet of carbon, for use as high density and/or high energy density power electrodes.

Carbon aerogels or foams produced by pyrolyzing organic precursors are known in the art, as exemplified by U.S. Pat. No. 4,873,218 issued Oct. 10, 1989; U.S. Pat. No. 4,997,804 issued Mar. 5, 1991; and U.S. Pat. No. 5,086,085 issued Feb. 4, 1992, each to R. W. Pekala. Also, recent efforts have been directed to the use of monolithic carbon aerogel electrodes for use in capacitors, etc., as exemplified by U.S. application Ser. No. 07/822,438 filed Jan. 17, 1992, entitled "Supercapacitors Based On Carbon Foams", in the name of J. L. Kaschmitter et al. now U.S. Pat. No. 5,260,855 issued Nov. 9, 1993; and U.S. application Ser. No. 08/090,881, filed Jul. 8, 1993 entitled "Cell Separator For Use In Bipolar-Stack Energy Storage Devices", in the name of S. T. Mayer et al.

Thin films of porous carbon are desired for use as electrodes in batteries and capacitors because they exhibit lower resistance and can provide high efficiency and high power capability. Thinner films also provide short electrolyte diffusion distances and better access to the carbon. Thin layers or films (<20 mils) of the prior monolithic carbon foams can be difficult to form and handle because they often are brittle. Processing of monolithic thin films is difficult due to the large amount of shrinkage that accompanies the curing and pyrolyzing, sometimes resulting in cracking of the material as it shrinks. Thus, there is a need for a method to form thin carbon foam hybrid/composite electrodes which overcome the disadvantages of the prior known monolithic carbon foams for use as electrodes.

The present invention satisfies this need by providing a method for producing thin, flat porous carbon electrodes with an electrically continuous, low resistance structure. The method involves the infiltration of a highly porous, low density (<0.2 g/cc) material, such as carbon paper or felt, with the appropriate carbon foam precursor material prior to pyrolysis. The infiltrated highly porous material (referred to hereinafter as the "substrate") allows for the carbon foam to shrink around fibers of the material, rather than around itself in the formation of a monolithic structure, thereby eliminating the above-mentioned shrinkage problem of the prior known monolithic carbon foams. The use of the porous substrate material can also allow for roll-to-roll processing of thin sheets of the carbon foam for improved manufacturability.

SUMMARY OF THE INVENTION

It is an object of the present invention to provide a method for producing thin carbon foam.

A further object of the invention is to provide thin carbon foam for use as electrodes in energy storage devices.

A further object of the invention is to provide a method for fabricating thin, flat carbon electrodes by infiltrating a highly porous substrate material with an appropriate carbon foam precursor material prior to pyrolysis thereof.

Another object of the invention is to provide a thin film of carbon for use as high power electrodes in capacitors, batteries and fuel cells, for example, with improved flexibility when compared to the more brittle prior monolithic structures.

Another object of the invention is to provide a method which infiltrates highly porous carbon papers with an appropriate carbon foam precursor material, curing the infiltrated material to form a gel-saturated carbon paper, and subsequently pyrolyzing the material to form a thin sheet of carbon foam.

Other objects and advantages of the invention will become apparent from the following description. Basically, the invention involves a method for fabricating thin, flat carbon foam which can be used as electrodes in energy storage devices, such as in a rechargeable lithium battery, as well as for capacitive deionization, filtration and catalysis. The method is basically carried out by infiltrating highly porous material, such as carbon papers, with an appropriate carbon foam precursor material which is subsequently cured and fired at high temperatures (500–3000° C.) to form a thin sheet of carbon foam. The material stays flat during curing and firing to form the thin sheets. The thin carbon foam can also, for example, be used in a spirally-wound or "jelly-roll" battery, for example, since the infiltrated carbon foam can be formed to shape more easily than monolithic carbon foam. The density of the thin carbon foam is controlled by the fabrication process and the choice of substrate. Also, sheets can be used in flat, prismatic cells and battery/capacitor designs and are potentially useful for capacitive deionization, filtration and catalysis.

DETAILED DESCRIPTION OF THE INVENTION

The invention involves the fabrication of flat, thin (thickness of 1 to 40 mil) carbon foam hybrid/composite electrodes which overcomes the disadvantages of the prior known carbon foam electrodes, such as described and claimed in the two above-referenced applications Ser. No. 07/822,438 and Ser. No. 08/090,881. The fabrication method involves infiltrating highly porous materials, such as carbon or metal fiber paper, membranes, felts, fabrics or metal powders and fibers with an appropriate carbon foam precursor material, the infiltrated material is then cured to form a gel-saturated material, which is subsequently fired in an inert atmosphere at high temperature (1050° C., for example) to form a flat, thin sheet of carbon foam. The infiltrated highly porous material allows the carbon foam to stick around the substrate fibers and expand/contract with the substrate during processing (through formation of microcracks), rather than as a monolithic structure, thereby eliminating the brittle structure of the prior carbon foams. The use of the infiltrated highly porous material can also allow for roll-to-roll processing of the material for improved manufacturability.

Carbon foam precursor materials are well known, as exemplified in the above-referenced U.S. Patents and copending applications. Potential precursor materials for this invention include but are not limited to polyacrylonitrite (PAN), polymethylacrylonitrile (PMAN), resorcinol/formaldehyde, catechol/formaldehyde, phenol/formaldehyde, etc., or mixtures thereof.

The present invention provides a method by which thin film fabrication of carbon foam hybrids/composites can be accomplished by infiltration of highly porous substrate material with a precursor sol or polymer solution. Experimental verification of the invention has been carried out using carbon papers as the porous material and PAN or resorcinol-formaldehyde as the precursor material, as is described as follows:

EXAMPLE 1

1. Dissolved approximately 12% w/v polyacrylonitrile (PAN) at an elevated temperature (~150° C.) in a 97:3 dimethyl sulfoxide (DMSO): water mixture. Other solvents are described in the above-referenced patents and copending applications.

2. The hot polymer solution was then uniformly infiltrated into carbon paper (125 micron thick, Textron C.05 made by Textron Specialty Chemicals, Lowell, Mass.; density of ~0.15 g/cc), until the paper was saturated. A 3 inch by 3 inch sheet of carbon paper was used, and the mixture was applied on the carbon paper by wicking the polymer solution into the paper.

3. The PAN-saturated carbon paper was then frozen at between −5° C. and −150° C., depending on the desired material characteristics.

4. The frozen, PAN-saturated carbon paper, was then freeze-dried at about −6° C. with pressure ramping from about 300 milli Torr to 0 milli Torr, for a time period of 8 to 48 hours, which depends on the thickness.

5. The freeze dried carbon paper is then fired in an inert atmosphere furnace to about 1050° C. for a time period of 4 hours, resulting in a flat, thin carbon foam (with a thickness of ~125 $\mu$m). Different firing (pyrolyzing) temperatures (500–3000° C.), and different time periods (1 to 8 hours) can be selected depending on the desired material characteristics. The inert atmosphere may be nitrogen, helium, argon, neon, or other inert gas.

If it is desirable to "activate" the carbon electrode, $CO_2$, steam, or air can be used as the purge gas during pyrolyzing. The freeze-dried carbon paper may be pyrolyzed at temperatures of 800–1200° C. in an oxidizing atmosphere (e.g. steam, air, $CO_2$), to produce "activated" carbon foam, which has a modified pore size distribution and higher surface area than when pyrolyzed in an inert atmosphere.

The density of the above fabricated thin carbon foam was ~0.27 g/cc. Higher densities can be produced by either re-saturating the PAN-saturated carbon paper after curing (freezing and freeze-drying), or after pyrolysis and then pyrolyzing again.

EXAMPLE 2

(Same as 1 but doped with lithium, phosphorous, aluminum, boron or arsenic compounds for improved electrochemical performance). For example, the freeze-dried PAN-carbon paper is exposed to a dilute solution of $H_3PO_4$ in methanol (9.64 g per 300 cc). The PAN-carbon paper is left in the $H_3PO_4$/methanol solution for a time period ranging from 8–48 hours. Upon removal from the solution, the methanol is allowed to evaporate leaving a coating of $H_3PO_4$ throughout the PAN/carbon paper. This material is then pyrolyzed as described above. The resultant thin carbon foam shows enhanced intercalation in a lithium-ion battery.

EXAMPLE 3

Textron C.05 carbon paper, density of ~0.15 g/cc, is infiltrated with a resorcinol-formaldehyde (RF) sol formula by reacting 12.35 g resorcinol powder, 17.91 g 37% formaldehyde, 0.0 g deionized $H_2O$, and 1.12 g 0.5M $Na_2CO_3$, for 10 minutes at ~50° C. The RF saturated carbon paper is placed between 2 glass plates that are then covered and sealed with a polymer film (e.g. Saran Wrap, made by The Dow Chemical Company). The RF/carbon paper is then cured for 1–4 hours at 50° C. followed by 1–3 days at 85–95° C. Upon removal from the glass plates, the $H_2O$ in the pores of the RF/carbon paper is exchanged with acetone. The acetone is then evaporated to form an air-dried RF/carbon paper. This material is pyrolyzed at 1050° C. for 4 hours in a nitrogen atmosphere. The resultant thin film carbon electrode has a density of ~0.6 g/cc. Density of the final material can be controlled by the RF sol concentration or multiple infusions. The air drying technique is described and claimed in copending U.S. application Ser. No. 08/041, 503 filed Apr. 1, 1993, entitled "Method Of Low Pressure And/Or Evaporative Drying of Aerogel".

EXAMPLE 4

Same as described above in Example 3, but using subcritical or supercritical drying using carbon dioxide, as taught in the above-referenced U.S. Patents to Pekala.

EXAMPLE 5

Chemical activation of the carbon electrodes by exposure to an 8M $HNO_3$ solution for 24–28 hours at 50° C. Provides improved double/layer capacitance results.

EXAMPLE 6

(Activated Example 4, $CO_2$ as the purge gas for 3 hours at 800–1200° C.

EXAMPLE 7

Same as Example 1, but using 3 mil AFS (Advanced Fiber Substrate) Nickel Metal Fabric, made by National Standard Company, Corbin, Tenn. as the substrate to be impregnated. Other metal fibers, powders, or fabrics containing nickel, titanium, aluminum, or stainless steel, and mixtures thereof may be used.

The freeze-dried carbon paper may be pyrolyzed at temperatures of 600–1200° C. in an oxidizing atmosphere (e.g. steam, air, $CO_2$), to produce "activated" carbon foam, which has a different pore size distribution and higher surface area than when pyrolyzed in an inert atmosphere.

The thus produced flat, thin films of carbon foam are ideal for high power electrodes in energy storage devices, such as a lithium intercalation anode in a rechargeable lithium ion battery, or as electrodes in capacitors, fuel cells, etc. These flat, thin carbon foams also have potential use in capacitive deionization, filtration and catalysis. In addition, the thin, flat carbon foams can be used in a spirally-wound or "jelly-roll" battery, since the thin carbon foam can be easily shaped.

It has thus been shown that the present invention provides a fabrication process for producing flat, thin carbon foam hybrid/composite electrodes. This is accomplished by the infiltration of a highly porous material, such as carbon paper, into the carbon foam during fabrication of the carbon foam.

While an example of a specific sequence of operational steps, materials, parameters, temperatures, uses, etc., have been set forth to describe the principles of the fabrication process of this invention, such is not intended to limit the invention to the specifics described. Modifications and changes will become apparent to those skilled in the art, and it is intended that the invention be limited only by the scope of the appended claims.

We claim:

1. A method or making carbon foam having a thickness of 1 to 40 mils, comprising the steps of:
   forming a carbon foam precursor material composed of a precursor solution formed from a precursor, a solvent and water;
   uniformly infiltrating a porous material substrate having a density of less than 0.2 g/cc with the carbon foam precursor material until the porous material is saturated;
   curing the thus saturated porous and precursor materials; and
   pyrolyzing the thus cured materials.

2. The method of claim 1, wherein the precursor solution is formed by dissolving about 12% PAN in a 97:3 DMSO:$H_2O$ mixture.

3. The method of claim 1, wherein the precursor solution is formed by reacting 12.35 g resorcinol powder, 17.91 g 37% formaldehyde, 0.0 g deionized $H_2O$, and 1.12 g 0.5 $Na_2CO_3$.

4. A method for making carbon foam having a thickness of 1 to 40 mils, comprising the steps of:
   uniformly infiltrating a porous material substrate having a density of less than 0.2 g/cc with a carbon foam precursor material until the porous material is saturated;
   the porous material being selected from the group consisting of a matrix of fibers, carbon paper, felt and cloth;
   curing the thus saturated porous and precursor materials; and
   pyrolyzing the thus cured materials.

5. A method for making carbon foam having a thickness of 1 to 40 mils, comprising the steps of:
   uniformly infiltrating a porous material substrate having a density of less than 0.2 g/cc with a carbon foam precursor material until the porous material is saturated;
   curing the thus saturated porous and precursor materials;
   the step of curing being carried out by freezing the saturated porous material, and then freeze-drying the frozen material; and
   pyrolyzing the thus cured materials.

6. The method of claim 5, wherein the step of pyrolyzing the thus cured material is carried out by firing in an inert atmosphere furnace at a temperature of 500–3000° C.

7. The method of claim 6, wherein the step of pyrolyzing is carried out at a temperature of about 1050° C., and wherein the inert atmosphere is nitrogen.

8. The method of claim 6, wherein the step of pyrolyzing is carried out in an oxidizing atmosphere and a temperature of about 600–1200° C.

9. The method of claim 5, wherein the carbon foam precursor material includes material selected from the group consisting of polyacrylonitrite (PAN), polymethylacrylonitrile (PMAN), phloroglucinal/formaldehyde, resorcinol/formaldehyde, catechol/formaldehyde, phenol/formaldehyde, and mixtures thereof.

10. The method of claim 1, wherein the porous material is selected from the group of carbon papers, membranes, felts, metal fibers and fabrics.

11. The method of claim 6, wherein the porous material is carbon paper, and wherein the carbon foam precursor material is composed of PAN dissolved in dimethyl sulfoxide, with water to form a precursor solution.

12. The method of claim 11, additionally includes the step of applying the mixture uniformly on the carbon paper until the paper is saturated, whereafter the saturated carbon paper is cured by freezing and freeze-drying, and is the pyrolyzed to form flat, carbon foam.

13. A method for making a carbon foam electrode having a thickness in the range of 1 to 40 mils, comprising:
   forming a precursor solution by dissolving PAN in a solvent and mixing with water to form a solution;
   applying the mixture uniformly to carbon paper until the paper is saturated;
   freezing the PAN-saturated carbon paper;
   freeze-drying the frozen, PAN-saturated carbon paper;
   pyrolyzing the freeze-dried carbon paper, whereby a flat carbon foam is formed having a density of 0.15 to 1 g/cc; and
   forming the carbon foam into an electrode.

14. The method of claim 13, wherein 12% PAN is dissolved in a solvent composed of 97% dimethyl sulfoxide and 3% water; wherein the carbon paper has a thickness of about 125 microns and density of about 0.15 g/cc; wherein the PAN-saturated carbon paper is frozen at a temperature of about −5 to −150° C.; wherein the frozen, PAN-saturated carbon paper is freeze-dried at about −6° C. with pressure ramping from about 300 milli Torr to 0 milli Torr; and wherein the freeze-dried carbon paper is pyrolyzed in an inert atmosphere at a temperature of about 1050° C., whereby the carbon foam has a thickness of about 125 $\mu$m and a density of about 0.27 g/cc.

15. The method of claim 13, wherein the density of the thus formed carbon foam is increased by either re-saturating the sol-saturated carbon paper after curing or after pyrolysis, and then pyrolyzing again.

16. The method of claim 13, wherein pyrolyzing is carried out in an atmosphere selected from the group of inert and oxidizing atmospheres.

17. A method for making a carbon foam electrode having a thickness of 1–40 mils, comprising:
   forming an RF precursor solution by reacting resorcinol powder, formaldehyde, deionized water and 0.5M $Na_2CO_3$;
   infiltrating carbon paper into the thus formed RF precursor solution until the carbon paper is saturated;
   curing the carbon paper/RF solution;
   exchanging water in the carbon paper/RF with acetone;
   evaporating the acetone to form an RF/carbon paper; and
   pyrolyzing in an atmosphere.

18. The method of claim 17, wherein pyrolyzing is carried out in either an inert or oxidizing atmosphere.

19. The method of claim 17, wherein evaporation of the acetone is carried out by air drying or by subcritical or supercritical drying.

20. The method of claim 17, additionally including doping of the thin carbon foam to provide improved electrochemical performance.

21. The method of claim 17, additionally including doping the thin carbon foam with dopant selected from the group of lithium, phosphorous, aluminum, boron and arsenic.

22. A method for making carbon foam having a thickness of 1 to 40 mils, comprising the steps of:
   uniformly infiltrating a porous material substrate having a density of less than 0.2 g/cc with a carbon foam precursor material until the porous material is saturated;

the porous material being selected from the group of membranes, papers, fabrics, felts, carbon fibers, cloths, and metal fibers and powders composed of nickel, titanium, stainless steel and aluminum, and mixtures thereof;

curing the thus saturated porous and precursor materials; and pyrolyzing the thus cured materials.

* * * * *